United States Patent
Nalam

(10) Patent No.: US 12,149,452 B2
(45) Date of Patent: *Nov. 19, 2024

(54) GROUPING RESOURCE METADATA TAGS

(71) Applicant: Amazon Technologies, Inc., Seattle, WA (US)

(72) Inventor: Rama Chandra Rao Nalam, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,305

(22) Filed: Jun. 6, 2023

(65) Prior Publication Data

US 2023/0344781 A1    Oct. 26, 2023

Related U.S. Application Data

(63) Continuation of application No. 17/727,543, filed on Apr. 22, 2022, now Pat. No. 11,711,314.

(51) Int. Cl.
*H04L 47/80* (2022.01)
*H04L 47/762* (2022.01)
*H04L 47/78* (2022.01)

(52) U.S. Cl.
CPC .......... *H04L 47/781* (2013.01); *H04L 47/762* (2013.01); *H04L 47/803* (2013.01)

(58) Field of Classification Search
CPC .... H04L 47/781; H04L 47/762; H04L 47/803
USPC ....................................................... 709/226
See application file for complete search history.

(56) References Cited

U.S. PATENT DOCUMENTS

| | | | |
|---|---|---|---|
| 9,197,703 B2 | 11/2015 | Mysur et al. | |
| 9,680,696 B1* | 6/2017 | Firment | G06F 9/5088 |
| 9,740,774 B2 | 8/2017 | Chaney et al. | |
| 10,366,111 B1 | 7/2019 | Florissi et al. | |
| 10,733,146 B2 | 8/2020 | Flick | |
| 10,771,337 B1* | 9/2020 | Das | H04L 47/70 |
| 11,095,506 B1* | 8/2021 | Erblat | H04L 41/0813 |
| 11,240,203 B1* | 2/2022 | Eyada | H04L 63/20 |
| 11,711,314 B1* | 7/2023 | Nalam | H04L 47/70 |
| | | | 709/226 |
| 2007/0026373 A1 | 2/2007 | Suriyanarayanan et al. | |
| 2011/0072374 A1* | 3/2011 | Kunz | G06Q 30/0276 |
| | | | 715/764 |
| 2018/0329967 A1 | 11/2018 | Lee et al. | |

(Continued)

*Primary Examiner* — Jude Jean Gilles
(74) *Attorney, Agent, or Firm* — Robert C. Kowert; Kowert, Hood, Munyon, Rankin & Goetzel, P.C.

(57) ABSTRACT

A system for applying metadata tags based on metadata tag groups is described. The system includes a plurality of compute nodes configured to provide a plurality of computing resources for clients of a provider network and a resource tag manager for the provider network. The resource tag manager is configured to receive, from a first client of an account of the provider network, a creation request to establish a resource attribute group comprising a plurality of resource keys and a plurality of resource values, wherein respective metadata keys correspond to respective resource values. The resource tag manager may receive, from a second client of the account, an application request to apply the resource attribute group to a computing resource and apply the plurality of resource keys and the plurality of resource values to metadata maintained for the computing resource.

20 Claims, 10 Drawing Sheets

(56) References Cited

U.S. PATENT DOCUMENTS

| | | |
|---|---|---|
| 2019/0245918 A1 | 8/2019 | Xu et al. |
| 2019/0294477 A1 | 9/2019 | Koppes et al. |
| 2019/0361852 A1* | 11/2019 | Rogynskyy ......... G06F 16/9024 |
| 2021/0120319 A1* | 4/2021 | Zhou ................ H04N 21/43074 |
| 2021/0320903 A1* | 10/2021 | Kalaycilar .............. H04L 43/06 |

* cited by examiner resource tag interface 600

Apply Tag Group Request 610

| resource identifier 602 | resource name 604 |

Select Tag Group 612

| tag group 612a | tag group 612b |
| tag group 612c | tag group 612d |

Resource Tags 614

| key 616a | value 618a |
| key 616b | value 618b |
| key 616c | value 618c |

⋮

| key 616n | value 618n |

SUBMIT 620

*FIG. 6*

```
                              800
```

Receive, at a resource attribute manager of a provider network, a creation request to create a resource attribute group, where the creation request indicates resource attributes to be applied to a given computing resource
802

Create the resource attribute group indicating the resource attributes to be applied to the given computing resource
804

Receive, from a client, a provision request to provision a new computing resource at one or more network-based services of the provider network
806

Provision the new computing resource at the one or more network-based services on behalf of the client
808

Receive a tag request to apply the resource attribute group to the new computing resource in accordance with an access control management service
810

Apply the resource attributes indicated in the resource attribute group to resource metadata maintained for the new computing resource
812

FIG. 8

GROUPING RESOURCE METADATA TAGS

This application is a continuation of U.S. patent application Ser. No. 17/727,543, filed Apr. 22, 2022, which is hereby incorporated by reference herein in its entirety.

BACKGROUND

Computing resources may be implemented by various services offered to clients by provider networks. The computing resources may include various aspects of the services and have different scopes of functionality that may be a subset of features available from the services. The services may have broad utility while the computing resources may be provisioned to be limited in scope for a client. The client categorizes the computing resources with metadata tags.

The metadata tags may be applied according to user interfaces configured to receive metadata keys and values. The metadata tags may be utilized for analytical or automated functions. However, entry of the metadata tags may be repetitive with the possibility of inconsistency when applying the same metadata tags across multiple computing resources. Minor discrepancies in metadata tags that should be the same would cause downline services to fail or have unintended behavior while managing the computing resources.

BRIEF DESCRIPTION OF THE DRAWINGS

FIG. 6 illustrates an example user interface for assigning a resource tag group to a computing resource, according to some embodiments.

FIG. 8 illustrates a flowchart diagram of a method for applying resource attributes to resource metadata maintained for a computing resource, according to some embodiments.

Figure 1:
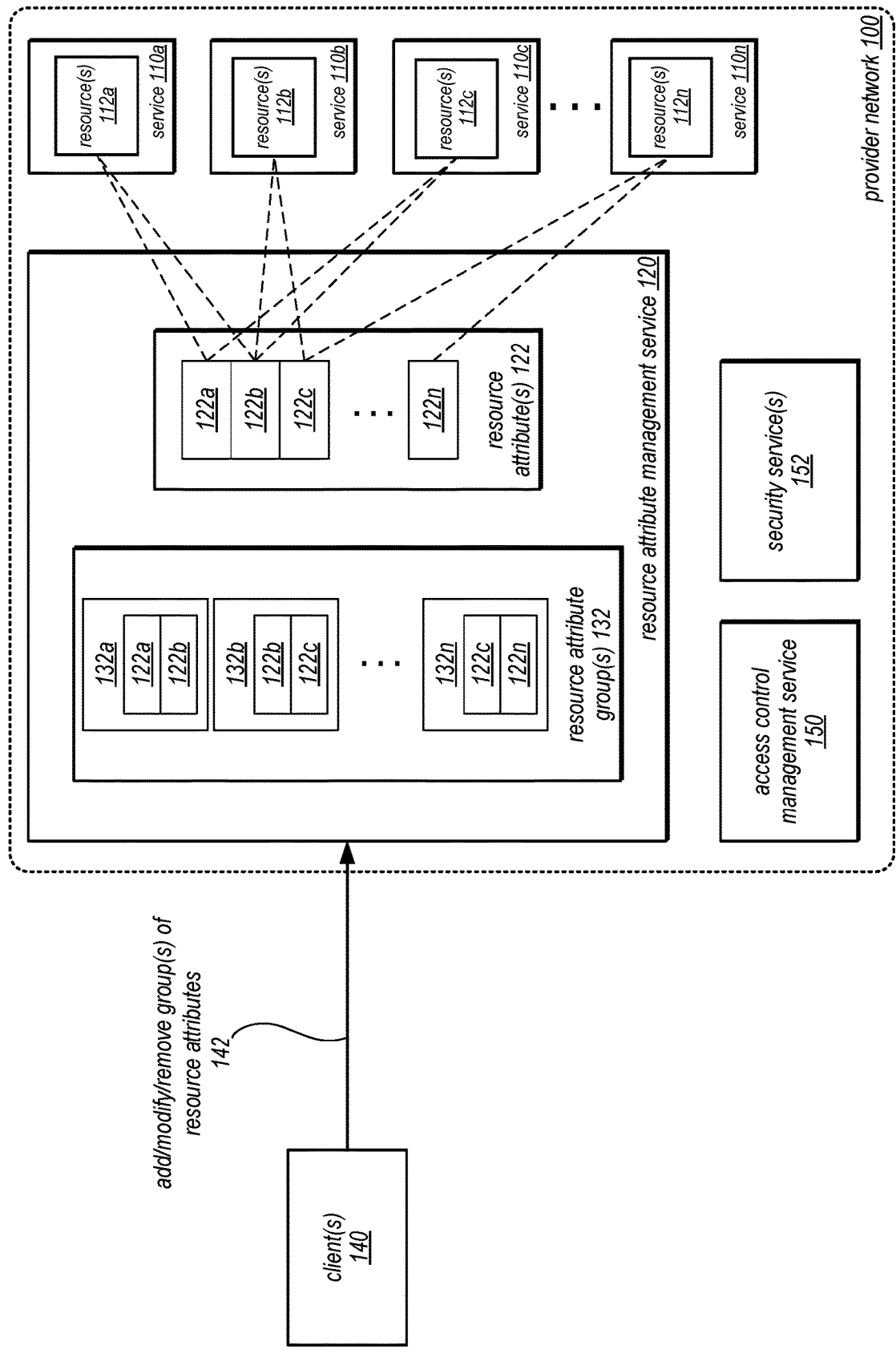
FIG. 1 illustrates a provider network configured to host a plurality of services subject to resource attribute management service on behalf of one or more clients, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for metadata tag grouping are described herein. Computing resources may be provisioned for clients. The computing resources may be managed, in part, by applying metadata tags (also referred to as "tagging") to the computing resources. Applying the metadata tags may include recording metadata in metadata stores associated with the computing resources. The metadata tags may include descriptive characteristics about the computing resources. For example, the metadata tags may also indicate features or capabilities of the computing resources. As another example, the metadata tags may indicate restrictions on the computing resources applied by the provider network or the client.

A client may provision a metadata tag group by sending a request that indicates the metadata tag group. The request may include the metadata tags to be included in the metadata tag group. The metadata tags may include metadata keys and metadata values in a key-value structure. Individual metadata keys may have corresponding metadata values such that the key-value pair is combined as a metadata tag that is applicable to computing resources in the provider network.

The client may request that a new computing resource be implemented and provisioned on behalf of the client. The client may indicate that the new computing resource is to be assigned the metadata tag group. A resource tag manager may be configured to apply the individual metadata tags of the metadata tag group to the new computing resource. In some embodiments, the resource tag manager may apply each of the metadata tags of the metadata tag group. The metadata keys and the respective metadata values are recorded to the metadata for the new computing resource.

The client may also include additional tags to be applied in addition to the metadata tags of the metadata tag group. The metadata tag group may be applied, and then the additional tags may be applied. In some situations, the client may attempt to set the additional tags to overlap or duplicate one or more of the metadata tags of the metadata tag group. In some embodiments, the metadata tag group may supersede any client-specified metadata tags. For example, the client may not be able to overwrite any of the metadata tags of the metadata tag group.

The metadata tag group may be configured to allow for client input for certain metadata tags. A metadata tag may be user-configurable with respect to the metadata value for a given key-value pair. Some metadata tags may include a null value set as the metadata value indicating that the client may assign a user-defined metadata value for a given metadata tag.

The metadata tags may be utilized by the provider network to manage the computing resources. For example, the provider network may include automated functions that are performed based on the metadata tags that are applied to multiple computing resources according to the tag groups.

In an aspect, a system is described. The system may include a plurality of compute nodes configured to provide a plurality of computing resources for clients of a provider network. The system may also include a resource attribute manager for the provider network implemented on or across one or more processors. The resource attribute manager may be configured to receive, from a first client of an account of the provider network, a creation request to establish a resource attribute group comprising a plurality of resource keys and a plurality of resource values, wherein respective metadata keys correspond to respective resource values. The resource attribute manager may also create the resource attribute group indicating the plurality of resource keys and the plurality of resource values. The resource attribute manager may further receive, from a second client of the account, an application request to apply the resource attribute group to a computing resource. The resource attribute manager may also apply the plurality of resource keys and the plurality of resource values to metadata maintained for the computing resource.

In another aspect, a method is described. The method may be performed by one or more computing devices that include one or more processors and a memory storing instructions. The method may include providing, via an interface of a resource tag service of a provider network, one or more resource attribute groups determined to be accessible to a client of the provider network according to an access control management service of the provider network. The method may also include receiving, via the interface of the resource tag service, a tag request determined to be associated with the client indicating a selected one of the one or more resource attribute groups to apply to a computing resource hosted at a service of the provider network, wherein the resource attribute group indicates a plurality of resource attributes to be applied as part of the resource attribute group. The method may further include applying the plurality of resource attributes to metadata maintained for the computing resource to tag the computing resource with the resource attribute group.

In yet another aspect, one or more computer-readable storage media is described. The one or more computer-readable storage media stores instructions that, when executed on or across one or more processors, cause the one or more processors to perform operations. The operations may include providing, via an interface of a resource tag service of a provider network, one or more resource attribute groups determined to be accessible to a client of the provider network according to an access control management service of the provider network. The operations may also include in response to a tag request determined to be associated with the client indicating a selected one of the one or more resource attribute groups to apply to a computing resource hosted at a service of the provider network, applying the plurality of resource attributes to metadata maintained for the computing resource to tag the computing resource with the resource attribute group, wherein the resource attribute group indicates a plurality of resource attributes to be applied as part of the resource attribute group.

FIG. 1 illustrates a provider network 100 configured to host a plurality of services 110a . . . n subject to resource attribute management service 120 on behalf of one or more clients 140, according to some embodiments. The provider network 100 may include one or more computing devices configured to provide one or more network-based services 110 to the clients 140. The services 110 may be configured as computing resources 112a . . . n for respective ones of the clients 140.

The services 110 may be organized according to one or more resource attributes 122a . . . n. A resource attribute may, in various embodiments, be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. The services 110 may create resource metadata and/or attributes when a resource is created by a client. However, a client may wish to modify, remove, and/or add new resources attributes to the resource metadata in order to provide greater flexibility for automating various interactions within the resources utilizing resource metadata.

The resource attribute management service 120 may be configured to manage the resource attributes 122, according to some embodiments. For example, the resource attribute management service 120 may be configured to apply, modify or remove respective ones of the resource attributes 122 to respective ones of the resources 112. In some embodiments, the clients 140 may send one or more instructions to cause the resource attribute management service 120 may be configured to apply, modify or remove respective ones of the resource attributes 122. In some embodiments, the resource attributes 122a . . . n may be defined by respective ones of the clients 140 associated with respective ones of the resources 112, such as resource 112a, 112b, 112c, and through 112n. In other implementations, the resource attributes 122a . . . n may be defined by the resource attribute management service 120 to describe respective ones of the resources 112a . . . n.

The clients 140 may define one or more resource attribute groups 132, such as resource attribute group 132a, 132b, and through 132n that respectively comprise one or more of the resource attributes 122, such as resource attributes 122a, 122b, 122c, and through 122n, according to some embodiments. For example, the clients 140 may select a subset of the resource attributes 122 to be incorporated into a given resource attribute group of the resource attribute groups 132a . . . n. In some embodiments, the clients 140 may provide key-value pairs to be stored as respective ones of the resource attributes 122.

The provider network 100 may also include an access control management service 150 configured to manage access to the resources 112 by the clients 140, according to some embodiments. For example, the access control management service 150 may restrict access by individual ones of the clients 140 for creating new resource attribute groups 132, modifying the resource attribute groups 132, or removing the resource attribute groups 132. In some embodiments, a first client may establish a given resource attribute group, and a second client may assign or access the given resource attribute group in accordance with the access control management service 150.

The provider network 100 may also include one or more security services 152 configured to perform tasks based on the resource tags assigned to a given resource. For example, the one or more security services 152 may perform automated or compliance tasks based on whether particular resource tags have been applied to the given resource. As an illustrative example, the resource 112a may have resource attributes 122a and 122b applied to the metadata for the resource 112a. The one or more security services 152 may determine that the resource attribute 122a allows the resource 112a to perform specific tasks on the provider network 100. As another example, the one or more security services 152 may determine that the resource 112a may be launched based on the resource attribute 122a being applied to the resource 112a.

The resource attribute groups 132 may indicate one or more of the resource attributes 122 to be applied to respective ones of the resources 112, according to some embodiments. As an illustrative, non-limiting example, the resource attribute group 132a may include an indication of the resource attributes 122a and 122b. If the resource attribute group 132a is assigned to a given resource of the resources 112, e.g., the resource 112, then individual resource attributes of the resource attributes 122a and 122b are applied to the resource 112a. This example application of the resource attributes 122a and 122b is depicted in FIG. 1 with dashed lines from the resource attributes 122a and 122b to the resource 112a. Other illustrated examples include the resource attribute group 132a being applied to the resource 112c such that that the resource attributes 122a and 122b are applied to the resource 112c. Another illustrated example includes the resource attribute group 132b being applied to the resource 112b such that that the resource attributes 122b and 122c are applied to the resource 112b. Yet another illustrated example includes the resource attribute group 132n being applied to the resource 112n such that that the resource attributes 122c and 122n are applied to the resource 112n.

The depicted applications of resource attributes 122 to respective resources 112 according to the resource attribute groups 132 are shown for illustrative purposes. The depictions are not intended to limit the scope to specific ones of the resource attributes 122 within a given resource attribute group 132. Other quantities of resources attributes 122 may be possible for any number of the resource attribute groups 132. In some embodiments, individual ones of the resource attributes 122 are not mutually exclusive between individual ones of the resource attribute groups 132. For example, as illustrated in FIG. 1, the resource attribute 122b is shown to be included in the resource attribute group 132a and the resource attribute group 132b.

The resource attribute groups 132 may be configured to receive one or more user-defined arguments, according to some embodiments. For example, the resource attribute group 132a may include resource attribute 122a and 122b. For illustrative purposes, the resource attribute 122b may be defined by a key-value pair where the key is defined while the value is undefined or a null value. The undefined value may indicate to the resource attribute management service 120 or the client 140 that the resource attribute 122b is able to receive a client-defined value. The client 140 may define the value as part of an attribute group request establishing the resource attribute group in some embodiments. In other embodiments, the client 140 may define the value after the resource attribute group 132a is applied to a given resource.

The resources 112 may be more efficiently managed by the resource attribute management service 120 by increasing consistency when applying the resource attributes 122 across the resources 112. The resource attribute groups 132 decrease the chance of improper entry of the resource attributes 122 while maintaining the computing resources 112. The resource attributes 122 may be applied as a batch or group to the resources 112 to provide the appropriate selected ones of the resource attributes 122.

Figure 2:
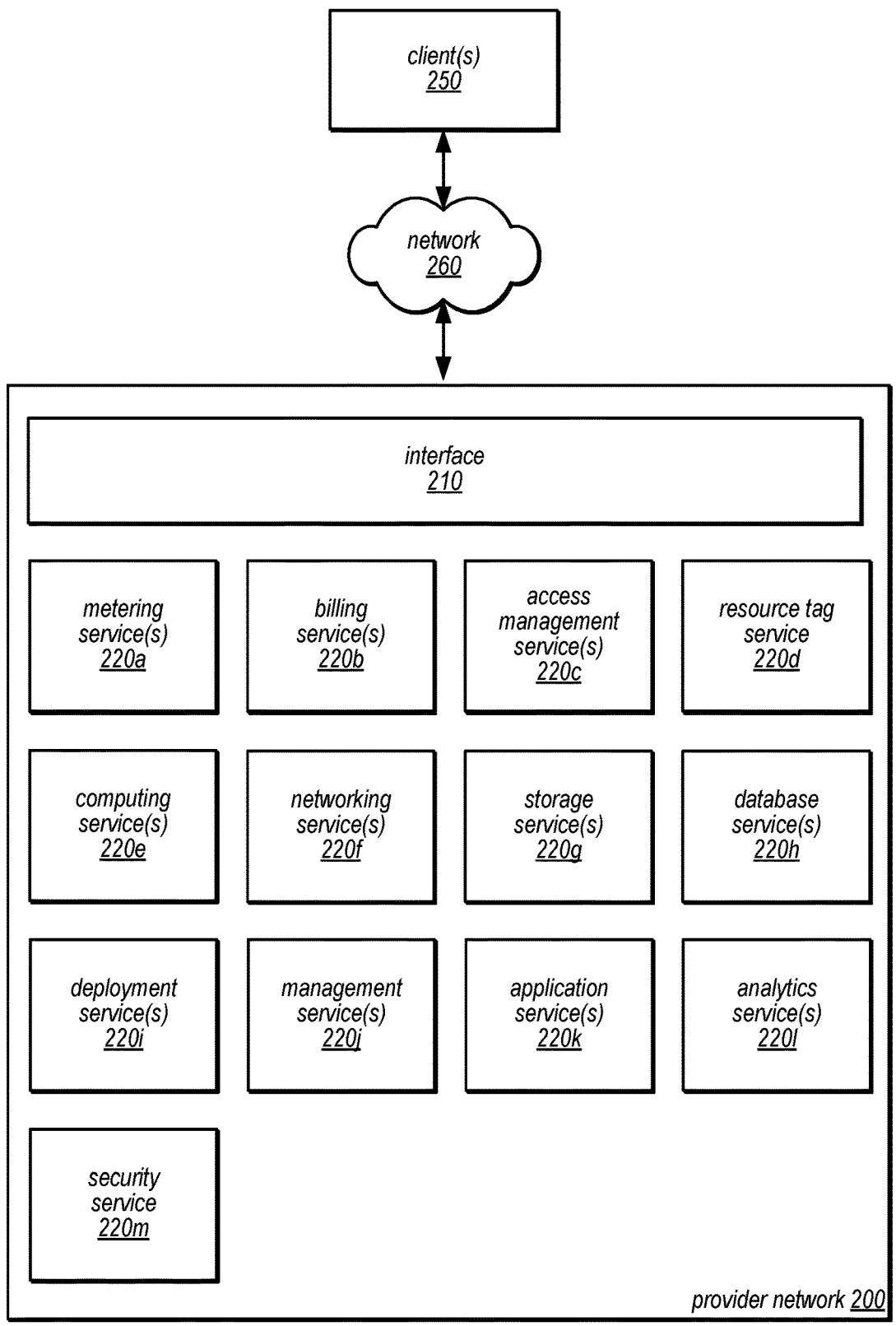
FIG. 2 is a block diagram illustrating a provider network that implements multiple different network-based services for clients, including a resource tag service, according to some embodiments.

FIG. 2 is a block diagram illustrating a provider network that implements multiple different network-based services for clients, including a resource tag service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. In at least some embodiments, provider network 200 may be organized into different regions, data centers, or other collections of devices to implement the services offered by provider network 200. Clients 250 may be configured to access via network 260 network-based services implemented as part of provider network 200 to perform various tasks, implement various systems, functions, or applications.

Provider network 200 may implement many different kinds of services, and thus the following discussion of various services is not intended to be limiting. For example, various network-based services may be implemented such as deployment service(s) 220i, management service(s) 220j, application service(s) 220k, and analytic service(s) 220l. In some embodiments, provider network 200 may implement storage service(s) 220g. Storage service(s) 220g may be one or more different types of services that provide different types of storage. For example, storage service(s) 220g may be an object or key-value data store that provides highly durable storage for large amounts of data organized as data objects. In some embodiments, storage service(s) 220g may include an archive long-term storage solution that is highly-durable, yet not easily accessible, in order to provide low-cost storage. In some embodiments, storage service(s) 220g may provide virtual block storage for other computing devices, such as compute instances implemented as part of virtual computing service 240. For example, a virtual block-based storage service 220g may provide block level storage for storing one or more data volumes mapped to particular clients, providing virtual block-based storage (e.g., hard disk storage or other persistent storage) as a contiguous set of logical blocks. Storage service(s) 220g may replicate stored data across multiple different locations, fault tolerant or availability zones, or nodes in order to provide redundancy for durability and availability for access.

In some embodiments, provider network 200 may implement database service(s) 220h. Database services 220h may include many different types of databases and/or database schemes. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

Provider network 200 may implement networking service(s) 220*f* in some embodiments. Networking service(s) 220*f* may configure or provide virtual networks, such as virtual private networks (VPNs), among resources implemented in provider network 200 as well as control access with external systems or devices. For example, networking service(s) 220*f* may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured.

Networking service(s) 220*f* may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

In some embodiments, provider network 200 may implement virtual computing service 220*e*, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, provider network 200 may implement components to coordinate the metering and accounting of client usage of network-based services, including network-based services 220*e*-220*l*, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s) 220*b* or may maintain a database of usage data that may be queried and processed by external systems for reporting and billing of client usage activity. In certain embodiments, provider network 200 may implement components (e.g., metering service(s) 220*a*) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access control management service(s) 220*c*, for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition. In at least some embodiments resource tag service 220*d*, discussed in more detail below with regard to FIGS. 3-5, may provide access to and management of resource attributes, such as tags, maintained for resources implemented at different network-based services. In some embodiments, security service 220*m* may perform tasks based on the resource tags assigned to a given resource. For example, security service 220*m* may perform automated or compliance tasks based on whether particular resource tags have been applied to the given resource.

Network-based services implemented as part of provider network 200 may each implement respective programmatic interfaces, in some embodiments. For example, requests directed to virtual computing service 220*e* may be formatted according to an API for virtual computing service 220*e*, while requests to storage service(s) 220*g* may be formatted according to an API for storage service(s) 220*g*. Different portions of the various APIs may be exposed to external clients, in some embodiments, with some other portions remaining available to internal clients, such as other network-based services in provider network 200. A provider network for network-based services platform 200 may also be implemented, in some embodiments, as interface 210. Interface 210 may be a programmatic interface and/or a graphical user interface (e.g., hosted on a network-based site for the provider network). Interface 210 may allow various requests, such as those discussed below with regard to FIGS. 4-5B.

Clients 250 may encompass any type of client configurable to submit requests to network-based services platform 200, in various embodiments. For example, a given client 250 may include a suitable version of a web browser or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
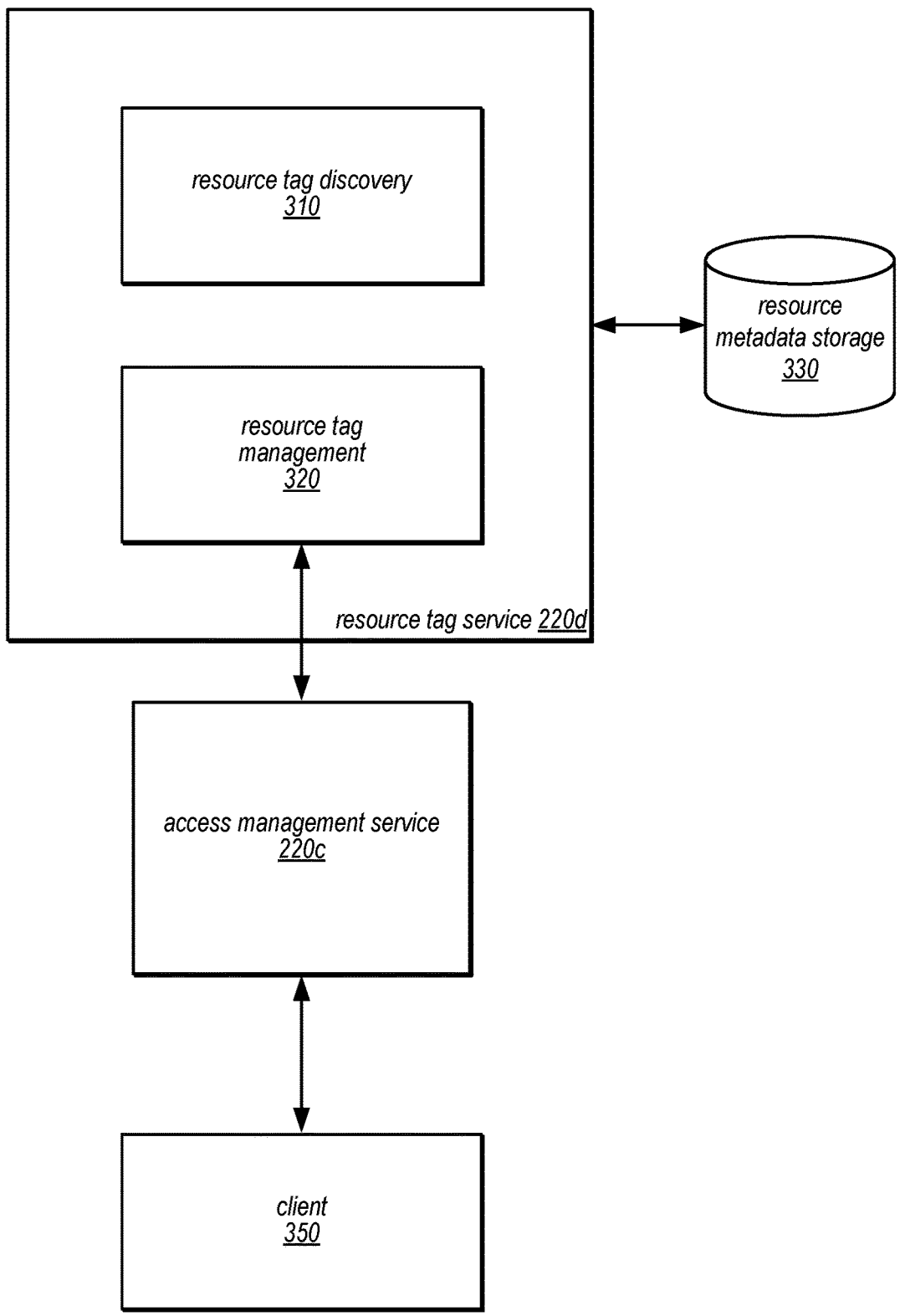
FIG. 3 is a block diagram illustrating a resource tag service that may provide automated management of resource attributes, such as tags, across network-based resources, according to some embodiments.

FIG. 3 is a block diagram illustrating a resource tag service that may provide automated management of resource attributes, such as tags, across network-based resources, according to some embodiments. Resource tag service 220*d*, as noted above, may provide access to and management of resource metadata maintained for resources implemented at different network-based services. As noted above, a provider network may be implemented or distributed across multiple data centers, regions or other collections of systems or devices (which may be referred to herein as infrastructure regions). In some embodiments, resource tag service 220*d* may be implemented, distributed and/or replicated across these different infrastructure regions. For example, resource tag discovery service 310 in FIG. 3 may be implemented for each infrastructure region of a provider network, providing an authoritative system for handling resource attribute operations for resources implemented within that region or data center. Some resource attribute operations may span multiple regions or data centers, and the different portions of resource tag service 220*d* replicated across the different regions or data centers may communicate information to one another as a part of performing different resource attribute operations. As illustrated in FIG. 3, resource tag service may implement a resource tag discovery module 310, for searching, evaluating, locating, and/or otherwise returning resource tags/or other resource attributes. Resource tag service 220*d* may also implement resource tag management component 320 to process requests to create, modify, and/or remove tags. Resource metadata storage 330 may be accessible to resource tag service 220*d*, either as dedicated storage for resource tag service 220*d* to persistently maintained resource attributes, such as tags, and/or may be implemented as part of another service, such as database services 220*h* and/or storage services 220*g*.

In various embodiments, resource tag discovery module 310 may be configured to identify those resources that satisfy selection criteria for attribution requests, as well as respond to requests for resource attributes, such as tags, specific to a particular resource, as discussed below with regard to FIGS. 8 and 9. For example, in some embodiments resource tag discovery module 310 may act as a query engine that processes queries for particular resources/resource attributes/tags. For example, in at least some embodiments, a portion of resource metadata storage may be allocated to and/or structured for resource tag discovery module 310, such as structured for online analytical processing (OLAP). In this way, resource tag discovery module can efficiently evaluate attribution request selection criteria, as well as provide quick responses to requests for specific metadata, in various embodiments.

In some embodiments, resource tag management module 320 may be configured to apply/modify/remove resource attribute groups, such as tag groups, as discussed below with regard to FIGS. 6 and 7. For example, in various embodiments, resource tag management module 320 may act as a transaction engine that is configured to update resource tags and other resource attributes according to the identified resources provided by resource tag discovery module 310 for a tagging or other attribution request. In at least some embodiments, a portion of resource metadata storage 330 may be allocated to and/or structured for resource tag management module 320, such as structured for online transaction processing (OLTP). In this way, resource tag management module 320 may provide consistency to updates made to resource tags (e.g., in the event of current updates to a particular resource, resource tag, other resource attributes, etc. . . . ).

Clients, such as client 350, may interact with the resource tag service 220d according to the access management service 220c, according to some embodiments. The access management service 220c may receive requests from the client 350, such as a creation request to establish a new resource attribute group based on a plurality of resource tags. The access management service 220c may determine whether the client 350 has authorization to create new resource attribute groups. Further, the access management service 220c may be configured to determine whether the client 350 is authorized to apply the resource attribute groups to resource metadata for computing resources.

Resource metadata storage 330 may provide persistent storage for resource metadata in various embodiments. In some embodiments, resource metadata storage may be configured differently for resource tag discovery and resource tag management 320, as noted above. For example, two data stores, storage engines, replicas, and/or storage services may be configured to provide the different types of storage. In at least some embodiments, storage for resource tag management 320 may push updates to the replica for resource tag discovery 310.

Figure 4:
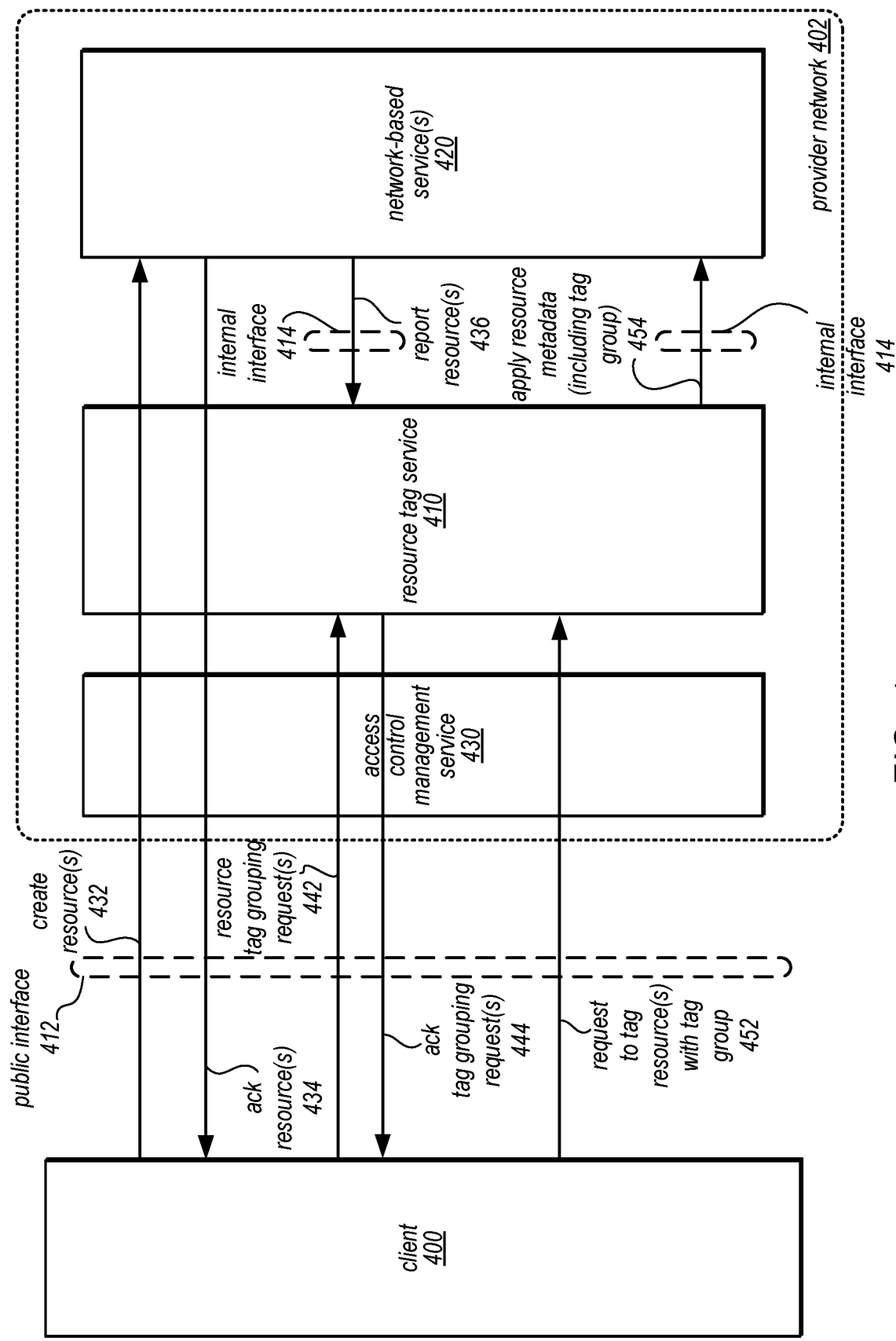
FIG. 4 is a diagram illustrating interactions among a client, resource tagging service, and network-based services, according to some embodiments.

FIG. 4 is a diagram illustrating interactions among a client, resource tagging service, and network-based services, according to some embodiments. A client 400 may interact with provider network 402, and resources and services therein via a public interface 412. Public interface 412 may be a programmatic interface, such as an application programming interface (API), and/or a graphical user interface (GUI). Requests and other communications from client 400 may be formatted according to public interface 412.

The provider network 402 may include an access control management service 430 configured to determine whether the client 400 has authorization to send various requests. For example, the access control management service 430 may determine whether the client 400 has authorization to create resources, create resource tag groups, apply resource tag groups, or any other interactions between the client 400 and the provider network 402. In some embodiments, the access control management service 430 may be configured to determine whether the client 400 is associated with another client that previously defined resource tag groups to be applied to the network-based resources 420.

Client 400 may send a request to create one or more resources 432 to network-based service(s) 420, in various embodiments. For example, clients may provision various compute instances, databases, storage volumes, data streams, or any other type of resource offered by provider network 402, such as discussed above with regard to FIG. 2. The various network-based services 420 responsible for implementing the resource may acknowledge the resources 434 back to the client 400 upon creation. In various embodiments, the network-based resources may also report 436 the new resources to resource tag service 410 via internal interface 414 (which may be implemented to facilitate communication between network-based service(s) 420 and resource tag service 410 internally). Internal interface 414 may, in various embodiments, be a programmatic interface. Resource metadata, such as the type, location, account, owner/creator, and/or any other network-based service 420 generated resource attribute (which may also be/include resource tags) may be provided as part of reporting the resources 436. As discussed above with regard to FIG. 3, resource tag service 410 may maintain the resource metadata for the network-based services.

Client 400 may also submit various resource tag grouping requests 442 (or other resource attribution requests), such as those discussed above with regard to FIG. 1 and FIGS. 8-9 below. For example, the client may submit a request to add a resource tag group to a customer account associated with client 400. In at least some embodiments, the resource tag grouping requests may specify metadata tags to be tagged to resources according to tag requests. Resource tag service 410 may acknowledge the tag grouping requests 444 to the client (or report errors).

Network-based services 420 may provide API commands or other requests to return description information for resources implemented at the network-based services 420. As illustrated in FIG. 4, client 400 may send an apply tag group request 452 to resource tag service 410 to apply a tag group to a particular resource. Resource tag service 410 may be authoritative for resource attributes. For example, in some embodiments, resource tag service 410 may apply 454 the resource metadata (including tags indicated by the tag group) to the network-based services 420 via internal interface 414.

Figure 5:
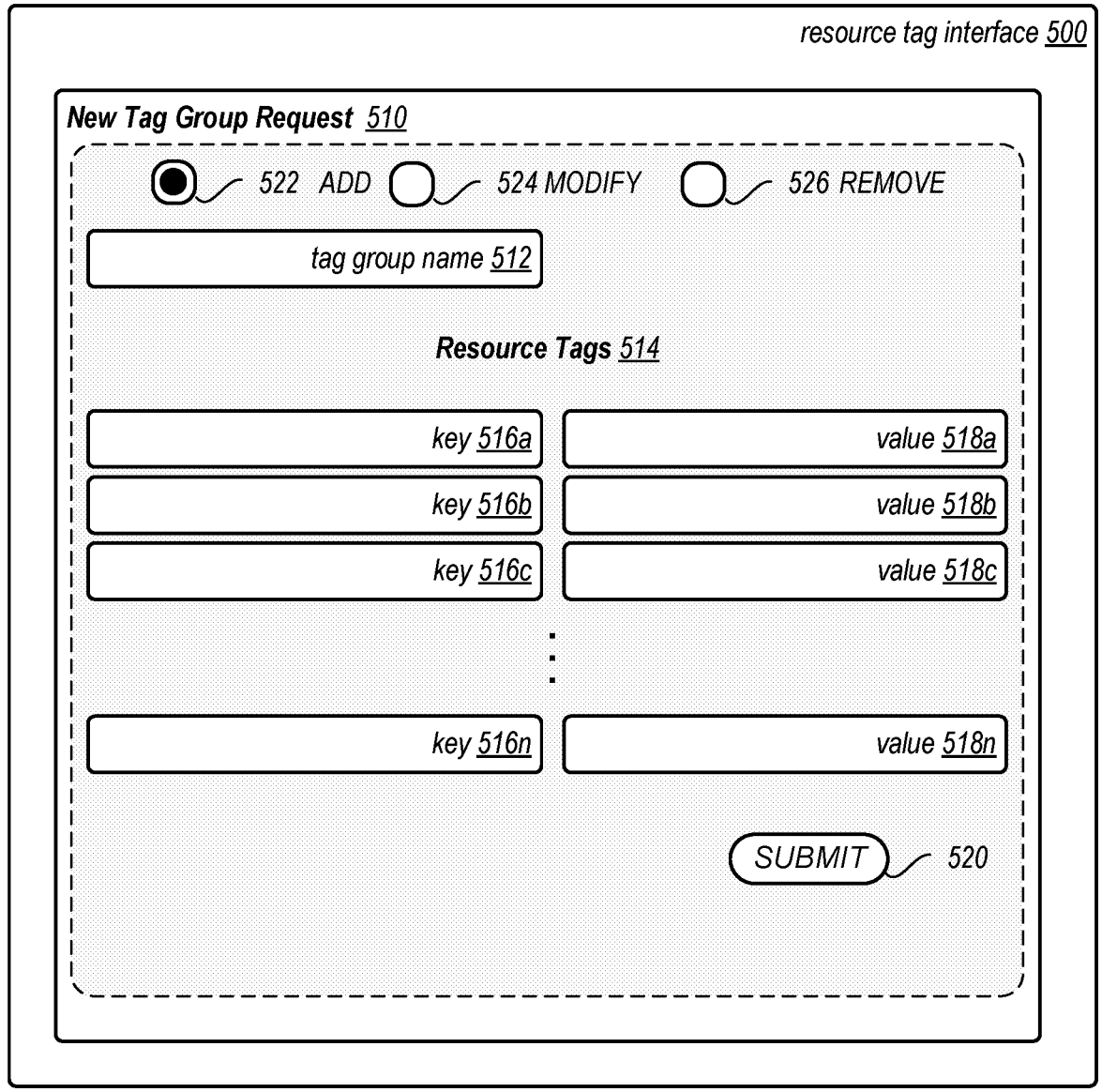
FIG. 5 illustrates an example user interface for establishing a new resource tag group, according to some embodiments.

FIG. 5 illustrates an example user interface for establishing a new resource tag group, according to some embodiments. The user interface may be presented to a client device as a resource tag interface 500, according to some embodiments. The resource tag interface 500 may be implemented by a provider network on behalf of a resource tag manager, such the resource attribute management service 120 of FIG. 1. The resource tag interface 500 may implement many different graphical user interface elements to facilitate the various types of resource tagging requests discussed above with regard to FIGS. 1 and 4, as well as FIGS. 6, 8 and 9 below. The resource tag interface 500 may be configured to manage one or more resource tag groups, such as the resource attribute groups 132 of FIG. 1.

The resource tag interface 500 may include a section to receive a new tag group request 510, according to some embodiments. For example, the new tag group request 510 may include options to add 522, modify 524, or remove 526 a resource tag group available to clients. For example, using add 522 may add a new resource tag group to a set of resource tag groups. As another example, using modify 524 may allow changing one or more aspects of a given resource tag group. As yet another example, using remove 526 may remove a given resource tag group from the set of resource tag groups.

Based on selecting add 522, the resource tag interface 500 may receive a tag group name 512, according to some embodiments. The tag group name 512 may be alphanumeric. The tag group name 512 may be defined by the client using the resource tag interface 500. In the resource tag interface 500, the client may define the resource tags 514 that are to be included in the new tag group request 510. In some embodiments, each of the resource tags 514 may be defined by keys 516 and values 518. For example, a first resource tag may be defined by key 516a and value 518a. A second resource tag may be defined by key 518b and value 518b. A third resource tag may be defined by key 518c and value 518c. Similarly, an n-th resource tag may be defined by key 518n and value 518n.

For a given resource tag of the resource tags 514, the key 516 may be defined in order to have the resource tag included as part of the new tag group request 510. For example, for the first resource tag, the key 516a may be defined for the first resource tag. The value 516a may be defined by the client in the new tag group request 510. In some embodiments, client definition of the value 518a may cause the value 518a to be immutable or unmodifiable after the first resource tag is applied to a given resource. The value 518a may be undefined or a null value in the new tag group request 510. In some embodiments, the value 518a being undefined or a null value may indicate that the value 518a may be client-defined or editable after the first resource tag is applied to the given resource.

The client may indicate that the new tag group request 510 is completed by interacting with a user interface element labeled SUBMIT 520. In response to interacting with SUBMIT 520, the resource tag interface 500 may perform one or more of the add 522, the modify 524, or the remove 526 to the resource tag groups.

FIG. 6 illustrates an example user interface for assigning a resource tag group to a computing resource, according to some embodiments. The user interface may be presented to a client device as a resource tag interface 600, according to some embodiments. The resource tag interface 600 may be implemented by a provider network on behalf of a resource tag manager, such the resource attribute management service 120 of FIG. 1. The resource tag interface 600 may implement many different graphical user interface elements to facilitate the various types of resource tagging requests discussed above with regard to FIGS. 1, 4, and 5, as well as FIGS. 8 and 9 below. The resource tag interface 500 may be configured to assign one or more resource tag groups, such as the resource attribute groups 132 of FIG. 1.

The apply tag group request 610 may identify a target resource based on a resource identifier 602 or a resource name 604. In some embodiments, the client may enter one or more of the resource identifier 602 or the resource name 604. In other embodiments, the client may select the resource identifier 602 or the resource name 604 with user interface elements that include a plurality of resource identifiers or resource names to select for tag grouping.

The resource tag interface 600 may include a section to receive an apply tag group request 610, according to some embodiments. For example, the apply tag group request may include user interface elements to select a tag group 612. One or more tag groups may be available for selection by the client. For example, tag groups 612s, 612b, 612c, and 612d may be presented in the resource tag interface 600 for selection by the client. In some embodiments, the tag groups 612s, 612b, 612c, and 612d may be arranged in a table for selection, as illustrated in FIG. 6. In other embodiments, the tag groups 612s, 612b, 612c, and 612d may be presented in a dropdown menu.

In addition to selecting the tag group 612, the client may apply one or more resource tags 614. For example, the client may define additional resource tags to be applied in addition to the resource tags included in the selected tag group 612. The client may provide input that defines one or more of keys 616a, 616b, 616c, . . . and 616n and one or more of values 618a, 618b, 618c, . . . and 616n. In some embodiments, the resource tag interface 600 may flag or indicate which of the keys 616a, 616b, 616c, . . . and 616n may conflict with the resource tags of the selected tag group 612. The conflicting resource tags may be analyzed to determine whether the conflicting resource tags may accept client definitions. For example, a conflicting resource tag may have a defined key while the corresponding value is undefined or a null value, so the conflicting resource tag may be defined with a client-provided value in place of the undefined or null value. As another example, if the conflicting resource tag has a defined key and the corresponding value already exists or is already defined, then the client-provided value may be rejected for addition to the conflicting resource tag. In some embodiments, the resource tag interface 600 may provide a notification indicating that the conflicting resource tag in fact conflicts with the client-defined resource tag. Alternatively, the resource tag interface 600 may provide a prompt requesting confirmation an override of the conflicting resource tag.

After selecting the selected tag group 612 and defining the client-defined resource tags 614, the client may interact with a user interface element labeled SUBMIT 620. In response to interaction with SUBMIT 620, the resource tag interface 600 may cause the resource tag manager to perform operations to apply the selected tag group 612 and the client-defined resource tags 614 to the designated resource.

Figure 7:
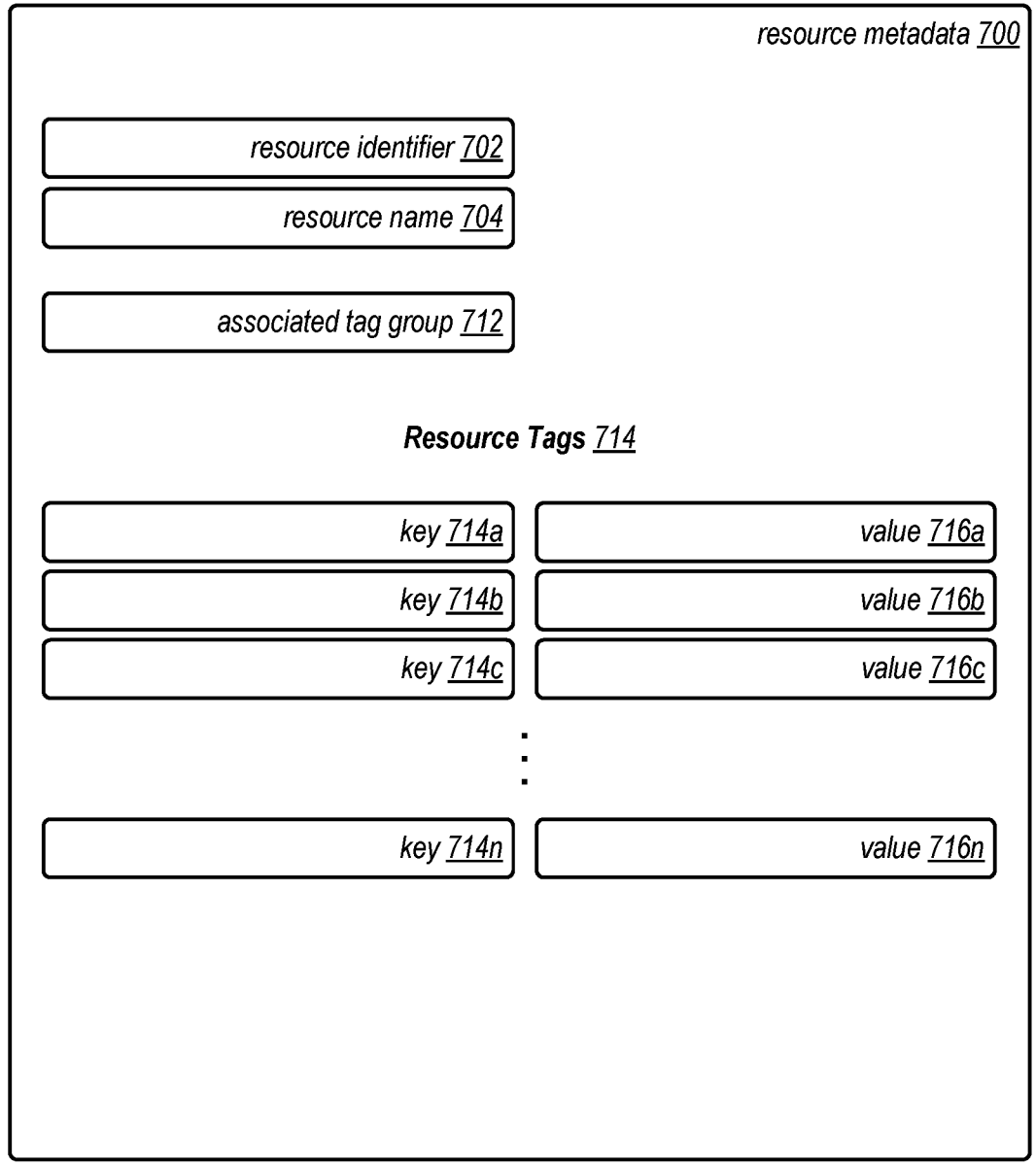
FIG. 7 illustrates a logical block diagram of resource metadata, according to some embodiments.

FIG. 7 illustrates a logical block diagram of resource metadata, according to some embodiments. The resource metadata may include metadata that describes one or more aspects of a computing resource provided by a network-based service provisioned for a client. The resource metadata 700 may include one or more elements based on adding or applying resource tag groups and/or resource tags as described with respect to FIGS. 5 and 6. The depicted logical structure of the resource metadata 700 is for illustrative purposes and not intended to be limiting as to the physical or logical structure of the resource metadata 700.

The resource metadata 700 may include a resource identifier 702, according to some embodiments. For example, the resource identifier 702 may be a unique identifier for the resource. As another example, the resource identifier 702 may be an internal identifier that may be used for internal computing systems to distinguish between other resources. The resource metadata 700 may also include a resource name 704. For example, the resource name 704 may be defined by the client, such as a provided name when the resource was provisioned.

The resource metadata 700 may also indicate an associated resource tag group 712, according to some embodiments. The associated resource tag group 712 may be applied to the resource metadata 700 as described with respect to FIGS. 6, 8 and 9. The resource metadata 700 may also include one or more resource tags 714. In some embodiments, the resource tags 714 may be defined by a key-value pair. For example, a first resource tag may be defined by key 716a and value 718a, a second resource tag may be defined by key 716b and value 718b, a third resource tag may be defined by key 716c and value 718c, and an n-th resource tag may be defined by key 716n and value 718n. The resource tags 714 may include a combination of resource tags included in the associated tag group 712 and client-defined resource tags.

The resource tags 714 may be added to, modified, or removed based on client requests. In some embodiments, resource tags from the associated tag group 712 may be protected from being modified or removed. For example, the resource tags from the associated tag group 712 may have more restrictive permissions such that the client is unable to edit the resource tags or values described therein.

FIG. 8 illustrates a flowchart diagram of a method 800 for applying resource attributes to resource metadata maintained for a computing resource, according to some embodiments. The method 700 may be implemented by one or more computing devices. In some embodiments, the method 800 may be implemented by a resource attribute manager, such as the resource attribute management service 120 of FIG. 1, the resource tag service 220*d* of FIGS. 2 and 3, or the resource tag service 410 of FIG. 4.

The method 800 may include receiving, at a resource attribute manager of a provider network, a creation request to create a resource attribute group, where the creation request indicates resource attributes to be applied to a given computing resource, at 802. The resource attribute manager may correspond to the resource attribute management service 120 of FIG. 1, the resource tag service 220*d* of FIG. 2 or 3, or the resource tag service 410 of FIG. 4, according to some embodiments. In some embodiments, the creation request may be provided from clients, such as the clients 140 of FIG. 1, the clients 250 of FIG. 2, or the client 400 of FIG. 4. In some embodiments, the creation request may be received from the client via one or more user interfaces, such as the resource tag interface 500 of FIG. 5. The creation request may include the resource attributes expressed as key-value pairs of metadata to be applied to the given computing resource. The given computer resource may be selected at a later time such that the resource attribute group may be created independently of any computing resources.

The method 800 may include creating the resource attribute group indicating the resource attributes to be applied to the given computing resource, at 804. The resource attribute manager may establish the resource attribute group to include the resource attributes indicated in the creation request. The resource attribute group may indicate the key-value pairs of the resource attributes to be applied to the given computing resource.

The method 800 may include receiving, from a client, a provision request to provision a new computing resource at one or more network-based services of the provider network, at 806. The provision request may indicate the one or more services to be provisioned as the new computing resource on behalf of the client. The method 800 may include provisioning the new computing resource at the one or more network-based services on behalf of the client, at 808. The provider network may be configured to provision the one or more services to provide the new computing resource to the client. In some embodiments, the new computing resource may be available to the client in response to the provision request.

The method 800 may include receiving a tag request to apply the resource attribute group to the new computing resource in accordance with an access control management service, at 810. In some embodiments, the tag request may indicate the resource attribute group and the new computing resource to which the resource attribute group is to be applied. The tag request may be provided according to a user interface, such as the resource tag interface 600 of FIG. 6. The resource attribute group may be selected from a plurality of resource attribute groups, such as the tag groups 612*a*, 612*b*, 612*c*, . . . and 612*n*, according to various embodiments. In some embodiments, the tag request may be analyzed in accordance with an access control management service, such as access management service 220*c* of FIGS. 2 and 3 or the access control management service 430 of FIG. 4. The access control management service may determine whether the client sending the tag request has authorization to apply the resource attribute group to computing resources or, specifically, the new computing resource. For example, the client may be authorized if the client is associated with an account for which the resource attribute group was created.

The method 800 may conclude by applying the resource attributes indicated in the resource attribute group to resource metadata maintained for the new computing resource, at 812. In some embodiments, applying the resource attributes may include writing the resource attributes to the resource metadata maintained by the resource attribute manager. In other embodiments, applying the resource attributes may include writing the resource attributes to the resource metadata maintained by the services which implement the new computing resource.

Figure 9:
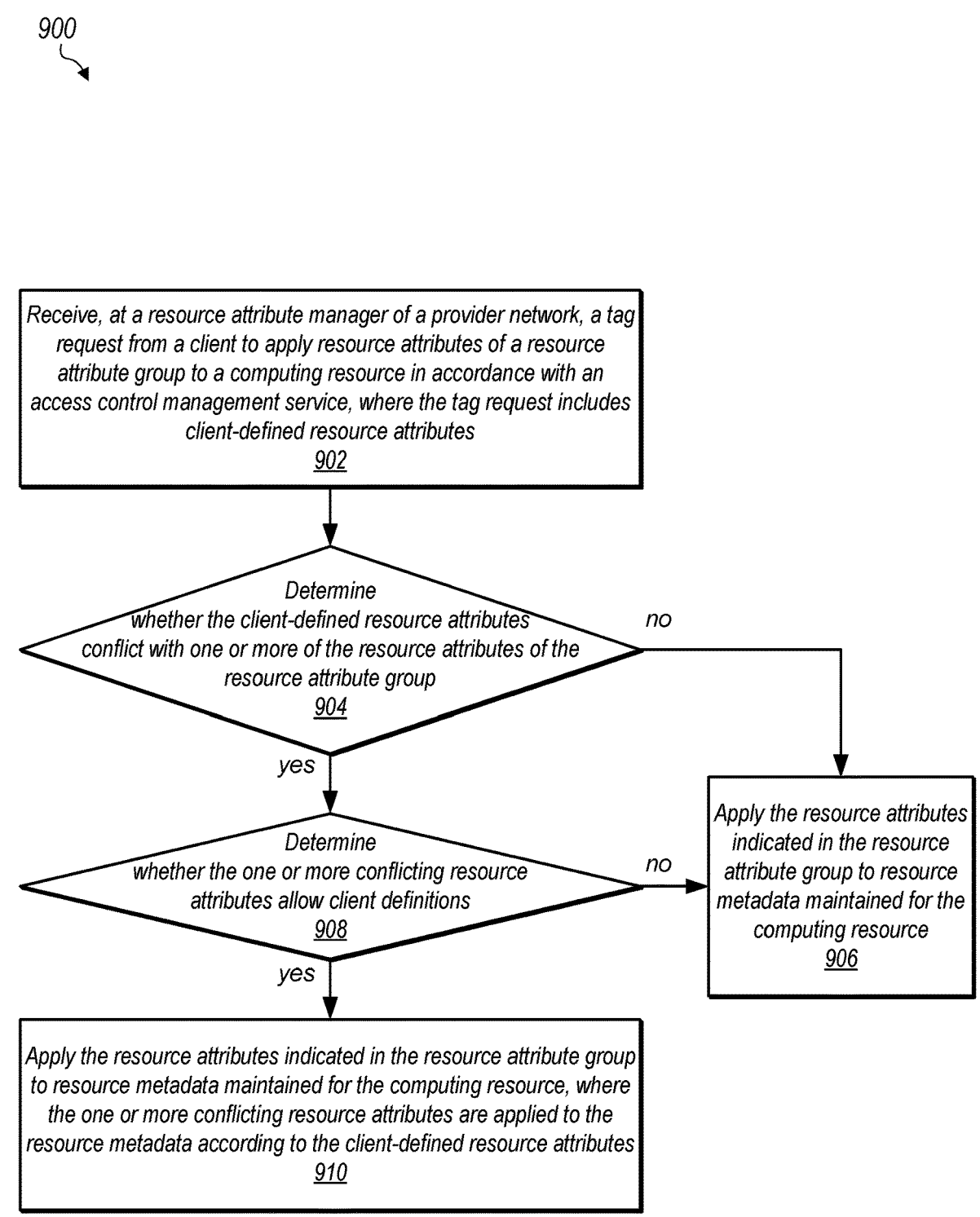
FIG. 9 illustrates a flowchart diagram of a method for applying resource attributes to resource metadata maintained for a computing resource according to a resource attribute group and client-defined resource attributes, according to some embodiments.

FIG. 9 illustrates a flowchart diagram of a method 900 for applying resource attributes to resource metadata maintained for a computing resource according to a resource attribute group and client-defined resource attributes, according to some embodiments. The method 700 may be implemented by one or more computing devices. In some embodiments, the method 800 may be implemented by a resource attribute manager, such as the resource attribute management service 120 of FIG. 1, the resource tag service 220*d* of FIGS. 2 and 3, or the resource tag service 410 of FIG. 4.

The method 900 may include receiving, a tag request from a client to apply resource attributes of a resource attribute group to a computing resource in accordance with an access control management service, where the tag request includes client-defined resource attributes, at 902. The tag request may be provided by a client according to a user interface, such as the resource tag interface 600 of FIG. 6. The resource attribute group may be selected from a plurality of resource attribute groups, such as the tag groups 612*a*, 612*b*, 612*c*, . . . and 612*n*, according to various embodiments. The computing resource may be implemented by a network-based service. The network-based service may include one or more of the services 110*a*, 110*b*, 110*c*, . . . and 110*n* of FIG. 1, the metering service 220*a*, the billing service 220*b*, the access management service 220*c*, the computing service 220*e*, the networking service 220*f*, the storage service 220*g*, the database service 220*h*, the deployment service 220*i*, the management service 220*j*, the application service 220*k*, or the analytics service 220*l* of FIG. 2, or the network-based service 420 of FIG. 4, according to various embodiments. In some embodiments, the tag request may be analyzed in accordance with an access control management service, such as access management service 220*c* of FIGS. 2 and 3 or the access control management service 430 of FIG. 4. The access control management service may determine whether the client sending the tag request has authorization to apply the resource attribute group to computing resources or, specifically, the new computing resource. For example, the client may be authorized if the client is associated with an account for which the resource attribute group was created.

The method 900 may include determining whether the client-defined resource attributes conflict with one or more of the resource attributes of the resource attribute group, at 904. In some embodiments, the client-defined resource attributes may be defined according to key-value pairs.

Similarly, the resource attributes of the resource attribute group may be defined according to key-value pairs. In some embodiments, the keys of the client-defined resource attributes may be compared against the keys of the resource attributes of the resource attribute group. If any keys of the client-defined resource attributes are found in the keys of the resource attributes, then these keys may be designated as conflicting resource attributes, according to some embodiments.

Based on a determination that the client-defined resource attributes do not conflict with the resource attributes of the resource attribute group, the method 900 may conclude by applying the resource attributes indicated in the resource attribute group to resource metadata maintained for the computing resource, at 906. In some embodiments, applying the resource attributes may include writing the resource attributes to the resource metadata maintained by the resource attribute manager. In other embodiments, applying the resource attributes may include writing the resource attributes to the resource metadata maintained by the services which implement the computing resource.

Based on a determination that the client-defined resource attributes do conflict with one or more of the resource attributes of the resource attribute group, the method 900 may include determining whether the one or more conflicting resource attributes allow client definitions, at 908. In some embodiments, the resource attribute manager may examine or analyze the conflicting resource attributes to determine whether client definitions may be applied to the conflicting resource attributes. For example, the conflicting resource attributes may include pre-defined values for the respective key-value pairs. In some embodiments, the pre-defined values may be immutable or unmodifiable by client definitions. In other embodiments, the resource attribute manager may allow the pre-defined values to be modified after prompting the client to approve the changes. As another example, the conflicting resource attributes may have undefined values that may be defined by the values of the client-defined resource attributes.

Based on a determination that the one or more conflicting resource attributes do not allow client definitions, the method 900 may conclude by applying the resource attributes indicated in the resource attribute group to resource metadata maintained for the computing resource, at 906. The client-defined resource attributes that conflict with the conflicting resource attributes may be disregarded or discarded. In some embodiments, the client-defined resource attributes that do not conflict with the conflicting resource attributes may be applied to the resource metadata.

The method 900 may include applying the resource attributes indicated in the resource attribute group to resource metadata maintained for the computing resource, where the one or more conflicting resource attributes are applied to the resource metadata according to the client-defined resource attributes, at 910. In some embodiments, applying the resource attributes may include writing the resource attributes to the resource metadata maintained by the resource attribute manager. In other embodiments, applying the resource attributes may include writing the resource attributes to the resource metadata maintained by the services which implement the computing resource. The values of the conflicting resource attributes that allow client definitions may be set according to the values of the client-defined resource attributes.

Figure 10:
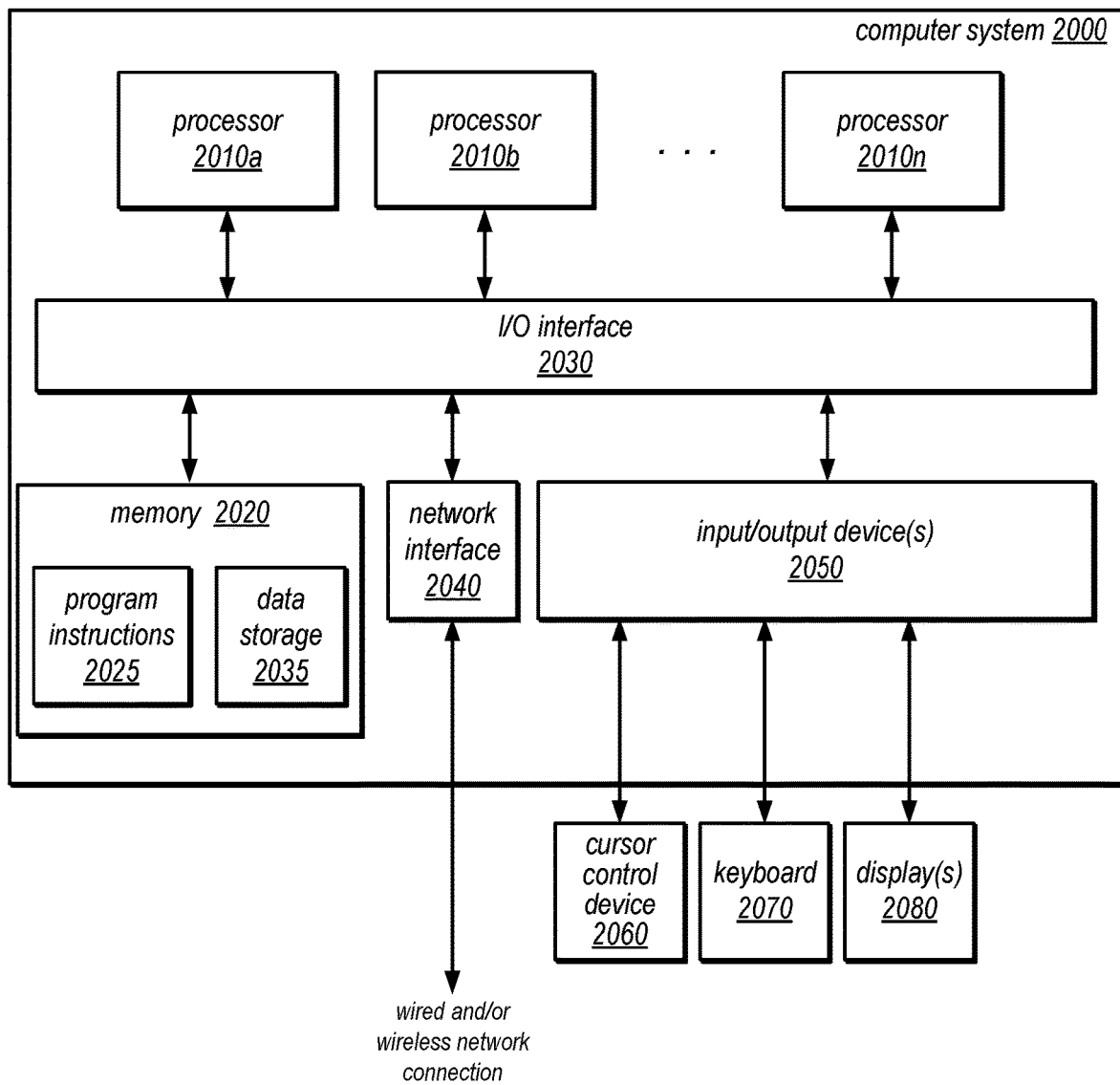
FIG. 10 illustrates a block diagram illustrating an example computer system that may be used in some embodiments.

As shown in FIG. 10, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present embodiments may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system comprising:
one or more processors and corresponding memory configured to:
create one or more tag groups comprising a plurality of attributes, the one or more tag groups associated with an account of a provider network of a service provider that provides computing resources as a service for clients of a plurality of accounts;
determine one or more computing resources provisioned on behalf of a client of the account; and
subsequent to said determine,
apply one or more of the tag groups associated with the account to metadata maintained for the one or more provisioned computing resources to tag the one or more provisioned computing resources with the attributes of the one or more tag groups being applied.

2. The system of claim 1,
wherein the one or more processors and corresponding memory are configured to:
provide an interface configured to receive requests to create tag groups; and
receive, via the interface, a tag group creation request to create one or more tag groups; and
wherein said create the one or more tag groups is performed in response to receipt, from the client via the interface, of the tag group creation request.

3. The system of claim 2,
wherein the one or more processors and corresponding memory are configured to:
in response to receipt of the tag group creation request, determine, according to an access control management service, that the client of the account is authorized to create the one or more tag groups; and
wherein said create the one or more tag groups is performed based on the determination that the client is authorized.

4. The system of claim 2, wherein:
the tag group creation request comprises a plurality of metadata keys and a plurality of metadata values, and
the one or more attributes of the tag group comprise the plurality of metadata keys and the plurality of metadata values.

5. The system of claim 1,
wherein the one or more processors and corresponding memory are configured to:
provide an interface for receiving requests to provision computing resources; and
receive, via the interface, a request to provision one or more computing resources; and
where said determine one or more computing resources is based on the request.

6. The system of claim 1,
wherein the one or more processors and corresponding memory are configured to:
provide an interface for receiving requests from clients to apply one or more tag groups to one or more computing resources; and
receive, via the interface, a request to apply one or more tag groups to the one or more computing resources; and
wherein said apply one or more tag groups is performed in response to receipt of the request.

7. The system of claim 6,
wherein the one or more processors and corresponding memory are configured to:
in response to receipt of the request to apply one or more tag groups,
determine, according to an access control management service, that the request to apply one or more tag groups is authorized; and
wherein said apply one or more of the tag groups is performed based on the authorization.

8. The system of claim 1, wherein the one or more processors and corresponding memory are configured to:
receive, from a second client, a creation request to establish a second resource attribute group, wherein the creation request comprises a second plurality of attributes;
determine, according to an access control management service, whether the second client is authorized to establish the second resource attribute group; and
create, based on the authorization, the second resource attribute group in response to the creation request, wherein the resource attribute group indicates the second plurality of attributes.

9. A method, comprising:
performing, by one or more computing devices:
creating one or more tag groups comprising a plurality of attributes, the one or more tag groups associated with an account of a provider network of a service provider that provides computing resources as a service for clients of a plurality of accounts;

determining one or more computing resources provisioned on behalf of a client of the account; and applying, subsequent to said determining, one or more of the tag groups associated with the account to metadata maintained for the one or more provisioned computing resources to tag the one or more provisioned computing resources with attributes of the one or more tag groups being applied.

10. The method of claim 9, further comprising:

providing an interface configured to receive requests to create tag groups; and receiving, via the interface, a tag group creation request to create a tag group; and wherein said creating the one or more tag groups is performed in response to said receiving the tag group creation request.

11. The method of claim 10, further comprising:

determining, in response to receiving the tag group creation request and according to an access control management service, that the request to create the one or more tag groups is authorized;

wherein said creating the one or more tag groups is performed based on the authorization.

12. The method of claim 10, wherein:

the tag group creation request comprises a plurality of metadata keys and a plurality of metadata values, and the plurality of attributes comprise the plurality of metadata keys and the plurality of metadata values.

13. The method of claim 9, further comprising:

receiving, via an interface from the client, a request to provision one or more computing resources;

wherein said determining one or more computing resources is based on the request.

14. The method of claim 9, further comprising:

providing an interface for receiving requests to apply one or more tag groups to one or more computing resources; and receiving, via the interface, a request to apply one or more of the tag groups to the one or more computing resources; and wherein said applying one or more of the tag groups is performed in response to receiving the request.

15. The method of claim 14, further comprising:

in response to receiving the request to apply one or more tag groups,
  determining, according to an access control management service, that the request to apply one or more tag groups is authorized;

wherein said applying one or more of the tag groups is based on determining the request is authorized.

16. The method of claim 9, further comprising:

receiving, from a second client, a creation request to establish a second resource attribute group, wherein the creation request comprises a second plurality of attributes;

determining, according to an access control management service, whether the second client is authorized to establish the second resource attribute group; and creating, based on the authorization, the second resource attribute group in response to the creation request, wherein the resource attribute group indicates the second plurality of attributes.

17. One or more computer-readable storage media storing instructions that, when executed on or across one or more processors, cause the one or more processors to:

create one or more tag groups comprising a plurality of attributes, the one or more tag groups associated with an account of a provider network of a service provider that provides computing resources as a service for clients of a plurality of accounts;

determine one or more computing resources provisioned on behalf of a client of the account; and apply, subsequent to said determine, one or more of the tag groups associated with the account to metadata maintained for the one or more provisioned computing resources to tag the one or more provisioned computing resources with the attributes of the one or more tag groups being applied.

18. The one or more computer-readable storage media of claim 17, further comprising instructions that, when executed on or across the one or more processors, cause the one or more processors to:

provide an interface configured to receive requests to create tag groups;

receive, via the interface, a tag group creation request; and perform said create one or more tag groups in response to said receipt of the tag group creation request.

19. The one or more computer-readable storage media of claim 18, further comprising instructions that, when executed on or across the one or more processors, cause the one or more processors to:

in response to receipt of the tag group creation request, determine, according to an access control management service, that the request to create the one or more tag groups is authorized; and perform said create the one or more tag groups based on the authorization.

20. The one or more computer-readable storage media of claim 18, wherein said receive a tag group creation request comprises receive a request comprising a plurality of metadata keys and a plurality of metadata values.

* * * * *